United States Patent [19]

Forkel

[11] Patent Number: 4,746,791

[45] Date of Patent: May 24, 1988

[54] FIBER OPTIC SENSOR WITH AN OPTICAL MODULATOR HAVING A PERMANENT MAGNET FOR THE DETECTION OF THE MOVEMENT OR POSITION OF A MAGNETIC COMPONENT

[75] Inventor: Werner Forkel, Stuttgart, Fed. Rep. of Germany

[73] Assignee: Daimler-Benz Aktiengesellschaft, Stuttgart, Fed. Rep. of Germany

[21] Appl. No.: 935,205

[22] Filed: Nov. 26, 1986

[30] Foreign Application Priority Data

Nov. 28, 1985 [DE] Fed. Rep. of Germany ....... 3542042

[51] Int. Cl.$^4$ .................. G01D 5/34; G01P 3/48; G01P 3/54
[52] U.S. Cl. ................ 250/231 SE; 250/237 G; 324/174; 324/208
[58] Field of Search .............. 324/174, 175, 208, 207, 324/160, 166, 226; 250/231 SE, 237 G; 73/653, 705; 340/347 P, 870.29; 356/395; 33/169 R

[56] References Cited

U.S. PATENT DOCUMENTS

| 3,191,440 | 6/1965 | Miller | 73/705 |
| 3,804,522 | 4/1974 | Smith | 250/231 SE |
| 4,074,128 | 2/1978 | Harris, Jr. et al. | 324/175 |
| 4,319,188 | 3/1982 | Ito et al. | 324/208 |
| 4,345,482 | 8/1982 | Adolfsson et al. | 73/653 |
| 4,506,339 | 3/1985 | Kühnlein | 324/175 |
| 4,536,708 | 8/1985 | Schneider | 324/174 |
| 4,551,715 | 11/1985 | Durbin | 324/175 |
| 4,626,781 | 12/1986 | Forkel | 324/174 |

FOREIGN PATENT DOCUMENTS

| 2730737 | 1/1979 | Fed. Rep. of Germany. |
| 3307966 | 9/1984 | Fed. Rep. of Germany. |
| 3401858 | 2/1985 | Fed. Rep. of Germany. |

OTHER PUBLICATIONS

VDI Report No. 515, 1984, pp. 31–37 by Dr. A. Wiesmeier & P. Schuerdt "Anwendung Faseroptischer Sensoren . . . ".

Primary Examiner—David C. Nelms
Assistant Examiner—Michael Messinger
Attorney, Agent, or Firm—Barnes & Thornburg

[57] ABSTRACT

A fiber optic sensor for the detection of the position or movement of a component, for example the speed of rotation of a shaft, is described, which is particularly suitable for use in a coarse environment. The optical modulator of the sensor comprises a permanent magnet and a modulator part, the permanent magnet and/or the modulator part being mounted so as to be movable relative to a transmitting and receiving light guide. A change caused by a movement generator, for example the shaft, causes a change in the course of the field lines emanating from the permanent magnet which causes a corresponding movement of the modulator part, whereby a greater or lesser proportion of the light radiated out by the transmitting optical fiber is modulated by the modulator part and is transmitted into the receiving optical fiber. The corresponding modulation of the light according to the intensity, color or polarization is then utilized as a measure of the movement or position of the component, and appropriately analyzed.

18 Claims, 10 Drawing Sheets

FIBER OPTIC SENSOR WITH AN OPTICAL MODULATOR HAVING A PERMANENT MAGNET FOR THE DETECTION OF THE MOVEMENT OR POSITION OF A MAGNETIC COMPONENT

BACKGROUND AND SUMMARY OF THE INVENTION

The invention relates generally to a fiber optic sensor for the detection of the movement or position of a component with a ferromagnetic portion. The fiber optic sensor includes a light transmitter, a light guide, an optical modulator with a permanent magnet and modulator part, all mounted in a housing. Both the light guide and light transmitter are connectable to an electronic analyzing system. The optical modulator part is mounted to be movable relative to the light transmitter and light guide.

A fiber optic sensor of the relevant type for the detection of the speed of rotation of a shaft is described in the Unexamined Published German Patent Application (German Offenlegungsschrift) No. 2,730,737 and in German Patent Specification No. 3,401,858, wherein the shaft is provided with a movement generator constructed for example as a toothed wheel or as a hexagonal nut. The sensor exhibits, in a housing, a transmitting light guide constructed as a light transmitter and a receiving light guide, which are connected to an electronic analysis system connected downstream. In this arrangement, the light irradiated by a light source via the transmitting light guide is coupled into the receiving light guide via an optical modulator, which at the same time represents the movement generator in a form in which the quantity of light is varied, the modulation frequency being utilized as a measure of the speed of rotation of the shaft and appropriately analyzed. The essential advantages of such fiber optic sensors are:

- rapid, reaction-free determination of measured values, potential separation between the measurement position and the electronic analysis system,
- no influence of electromagnetic interference field on the signal,
- no transfer of electromagnetic interference fields, and on-contact scanning.

However, a disadvantage of these fiber optic sensors is that, as a result of the fact that the sensors must be guided to the measurement position, the optical fibers used as a light source and light guide are susceptible to contamination when used in a coarse environment, which has direct effects on the measurement result. In addition to this, the movement generator has to be constructed in such a manner that it can also serve as an optical modulator, which means that the toothed wheel or the hexagonal nut must be adapted as an optical modulator in accordance with the additional purpose of application, for example by polished surfaces or light-dark markings.

Furthermore, a fiber optic pressure sensor is also described in publication (VDI) (Association of German Engineers) Reports No. 515, 1984, pages 31-37, in particular page 35) wherein an aperture, set towards the pressure chamber, in the housing of the sensor is sealed by a metal membrane. The metal membrane is illuminated on the rear surface by a transmitting optical fiber. A proportion of the light reflected by the rear surface of the membrane is detected by a receiving optical fiber and appropriately analyzed. The more the pressure rises, the greater is the extent to which the membrane bends. This geometric variation causes a modulation of the light signal.

A similar principle is disclosed in the case of a temperature sensor in the Unexamined Published German Patent Application (German Offenlegungsschrift) No. 3,307,966.

An object of the present invention is to provide an improved fiber optic sensor of the relevant type in such a manner that it can be used without susceptibility to contamination, even in a coarse environment and an adaptation of the movement generator is not required.

According to the invention, these objects are achieved by providing an improved fiber optic sensor device having a light transmitter, a light guide, and an optical modulator disposed in a housing. The optical modulator part is moveable relative to the light transmitter and light guide. A permanent magnet cooperates with a modulator part. The magnet responds to movement of a ferromagnetic movement generator and the modulator part correspondingly responds whereby a change in the light signal is analyzed by electronic analysis system connected downstream.

Other objects, advantages and novel features of the present invention will become apparent from the following detailed description of the invention when considered in conjunction with the accompanying drawings.

DETAILED DESCRIPTION OF THE DRAWINGS

FIGS. 1-9 each show a shaft 1 with a ferromagnetic movement generator 2, which rotates together with the latter and which exhibits at its periphery magnetically highly effective —2'— and magnetically weakly effective —2"— regions and which can be constructed as a toothed wheel or as a perforated or slotted diaphragm. In the radial direction relative to the movement generator 2—or also in the axial direction of the movement generator and in the vicinity of the periphery thereof—there is disposed the sensor 3, in the housing 4 of which a light guide 5 (receiving optical fiber) and a light transmitter 6—for example also constructed as an optical fiber, incandescent lamp or as a light-emitting diode—are fixed, which are connectable or connected via extensions to an electronic analysis system which is connected downstream and which is not shown.

Figure 1:
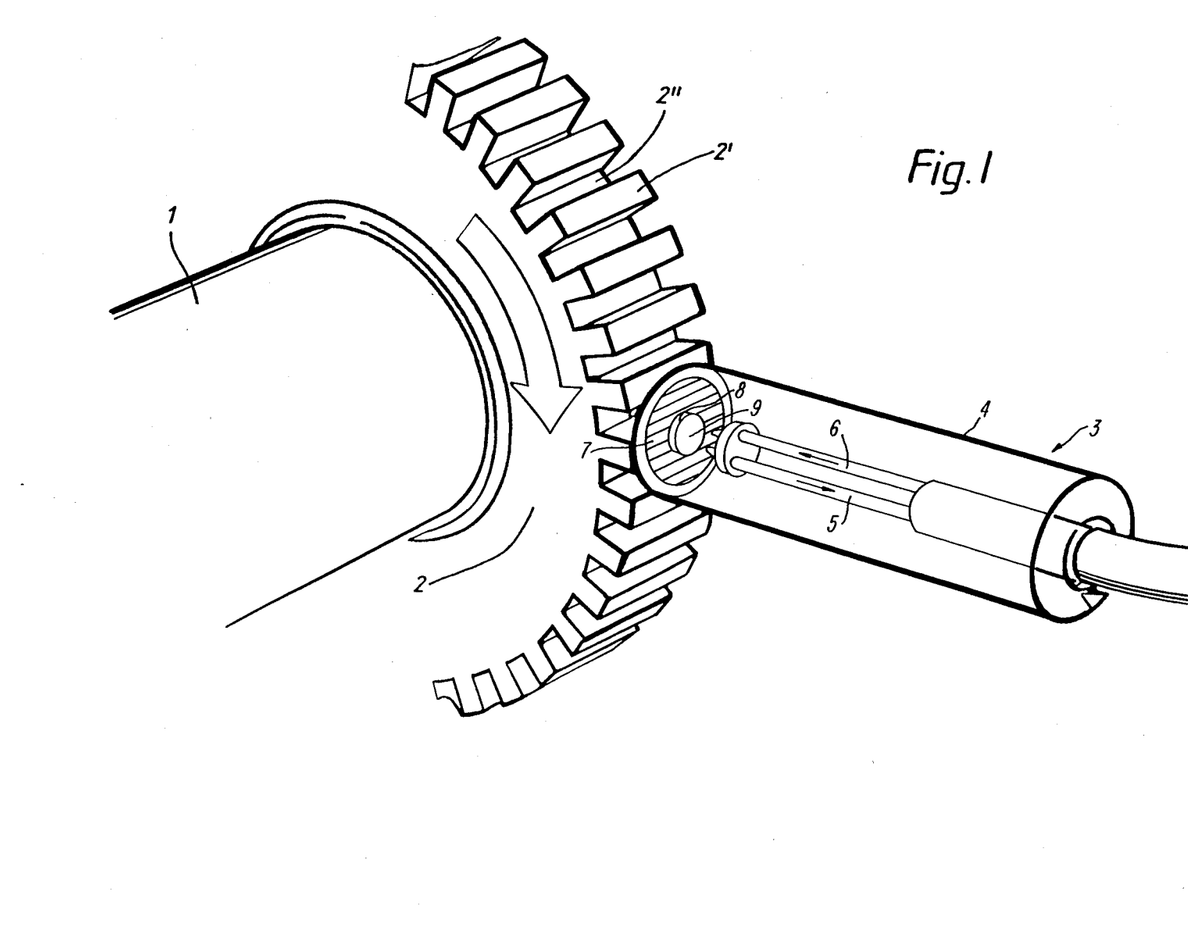
FIG. 1 to FIG. 9 are schematic partial perspective views of various respective embodiments of a sensor arrangement, which can also be designated as a magneto-optic fiber sensor, constructed in accordance with the present invention.
Figure 2:
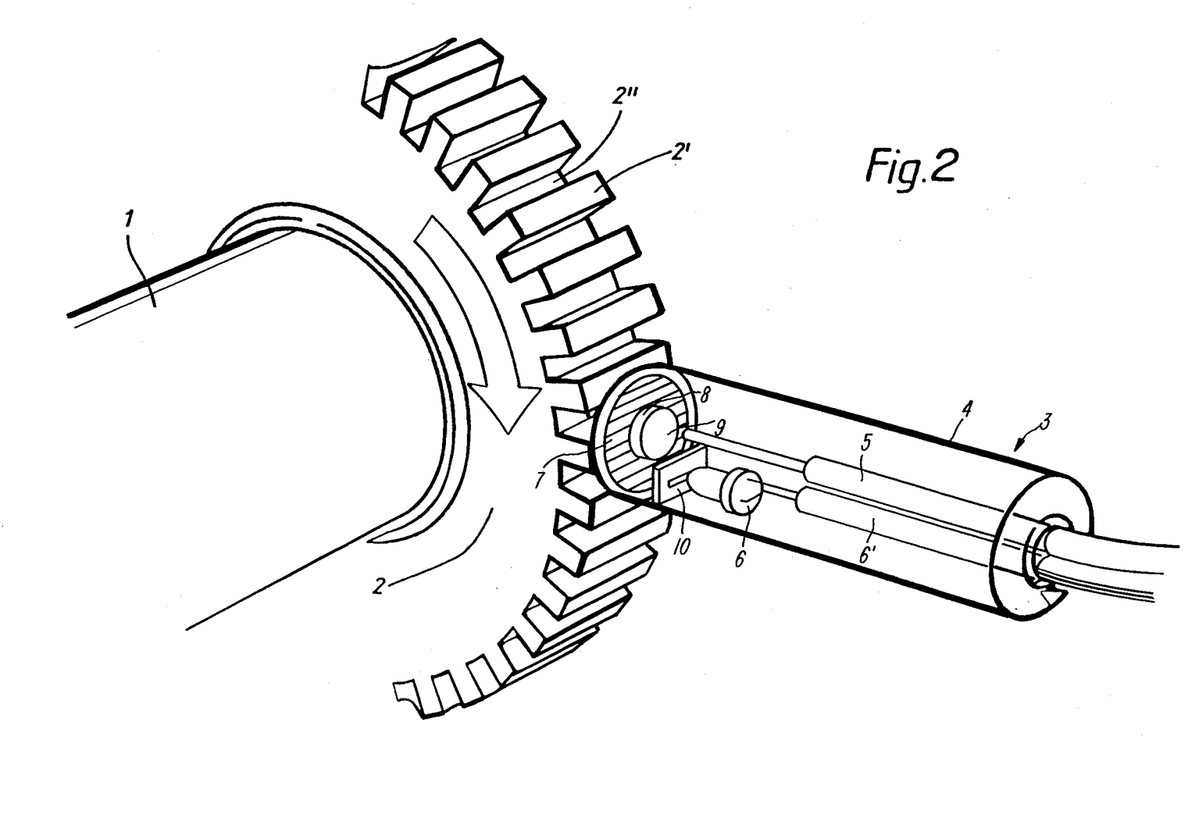
Figure 3:
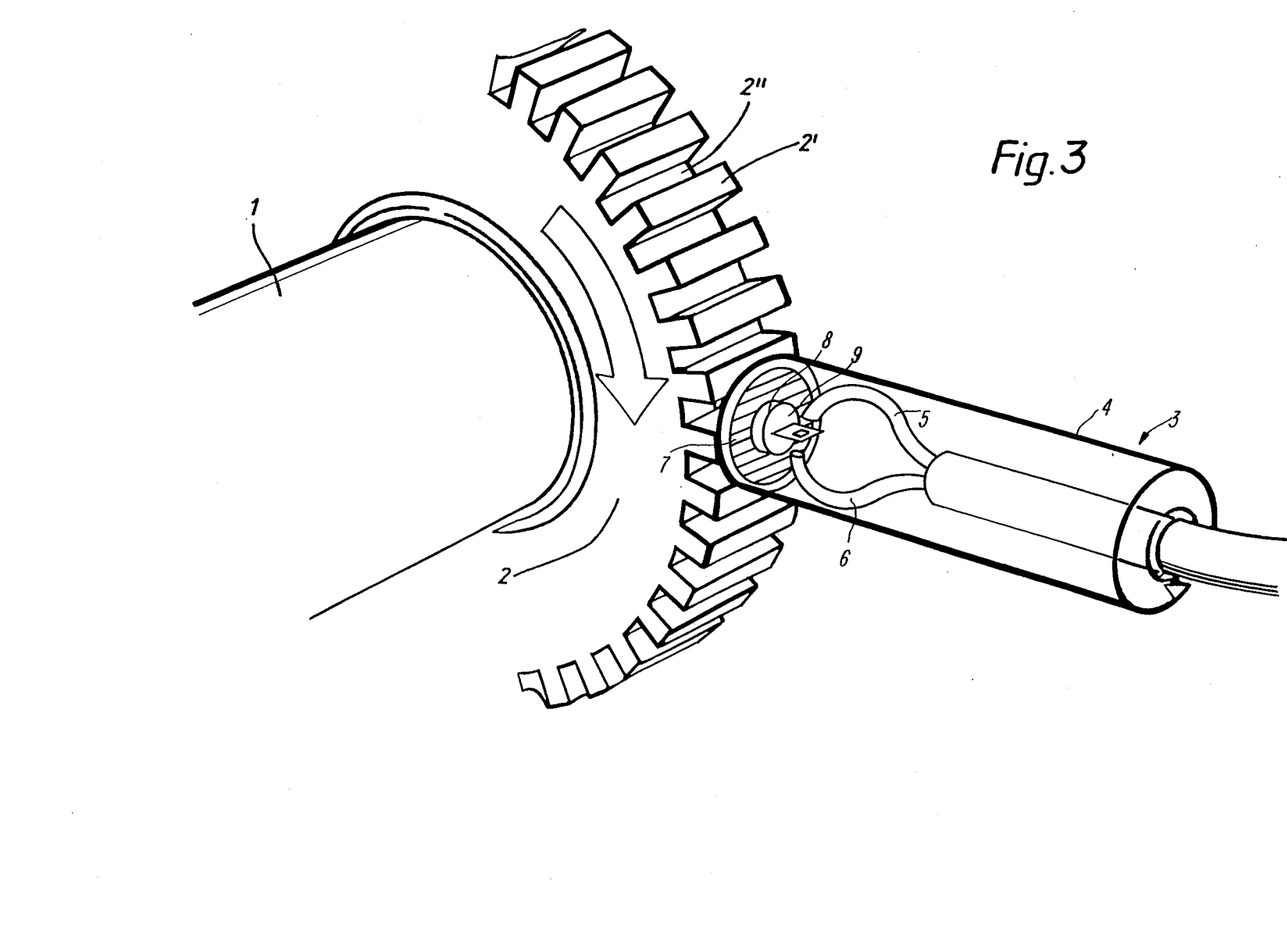

According to FIGS. 1 to 3, the end which forms the front surface, and which faces the movement generator 2, of the housing 4 is closed by an elastic foil 7—preferably consisting of plastic material—in the center of which a permanent magnet 8 is secured with the pole axis extending in the longitudinal direction of the housing 4. In front of this foil there is situated, for the protection thereof against damage and for the avoidance of acoustic microphone action, an airtight protective cap, while the foil itself is constructed to permit pressure compensation.

As is evident from FIG. 1, the permanent magnet 8 exhibits a mirror-coated surface, facing the transmitting optical fiber 6 and the receiving optical fiber 5, as reflector part 9, the arrangement and dimensioning between permanent magnet 7 and modulator part 9 on the one hand and the fibers 5, 6 on the other hand being undertaken in such a manner that in the rest condition of the sensor and movement generator the light radiation emitted by the transmitting optical fiber 6 is reflected by the modulator part 9 and is coupled into the receiving optical fiber 5.

On the other hand, if the shaft 1 and thus also the movement generator 2 rotate, then the permanent magnet 8 is attracted by each tooth—magnetically highly effective region 2'—because of the field lines forming a closed configuration via the latter, and thus also the foil 7 is deflected, while at each gap between teeth—magnetically weakly effective region 2"—it is restored again because of the change in the course of the field lines and the restoring force of the elastic foil 7. Thus, the permanent magnet 8 executes an oscillation, the frequency of which corresponds to the sequence frequency of the teeth. However, the modulator part 9 is also deflected in accordance with the foil or permanent magnet deflection, so that a greater or lessor proportion of the light radiation emitted by the transmitting optical fiber 6 is reflected by the modulator part 9 and coupled into the receiving optical fiber 5. This modulation frequency is then utilized as a measure of the speed of rotation of the shaft and appropriately analyzed in the electronic analysis system connected downstream.

While in the exemplary embodiment according to FIG. 1, light is transmitted via the transmitting optical fiber 6 from an external light source, disposed for example in the electronic analysis system, in the exemplary embodiment according to FIG. 2 a light source is integrated in the sensor 3 itself as a light transmitter 6, for example an LED light-emitting diode, which is supplied via an electrical supply cable 6' from a power source located near to the sensor. The light radiation emitted by the light transmitter 6 is, in this arrangement, directed via an aperture 10 to the modular part 9 of the permanent magnet 8. In other respects, the construction and the mode of operation of the sensor correspond to those according to FIG. 1.

The exemplary embodiment according to FIG. 3 also corresponds to a large extent to that according to FIG. 1. In this arrangement, in place of a mirror-coated surface as the modulator part, the permanent magnet 8 exhibits as the modulator part 9 a perforated or slotted diaphragm connected to it so that on a deflection of the foil 7 and thus of the permanent magnet 8 and of the modulator part 9 a greater or lesser proportion of the light radiation emitted by the transmitting optical fiber 6 is coupled into the receiving optical fiber 5 via the modulator part 9. In place of an intensity modulation, it is however also contemplated to cause a color modulation of the light, with the modulator part 9 constructed as a color-modulating filter.

Figure 4:
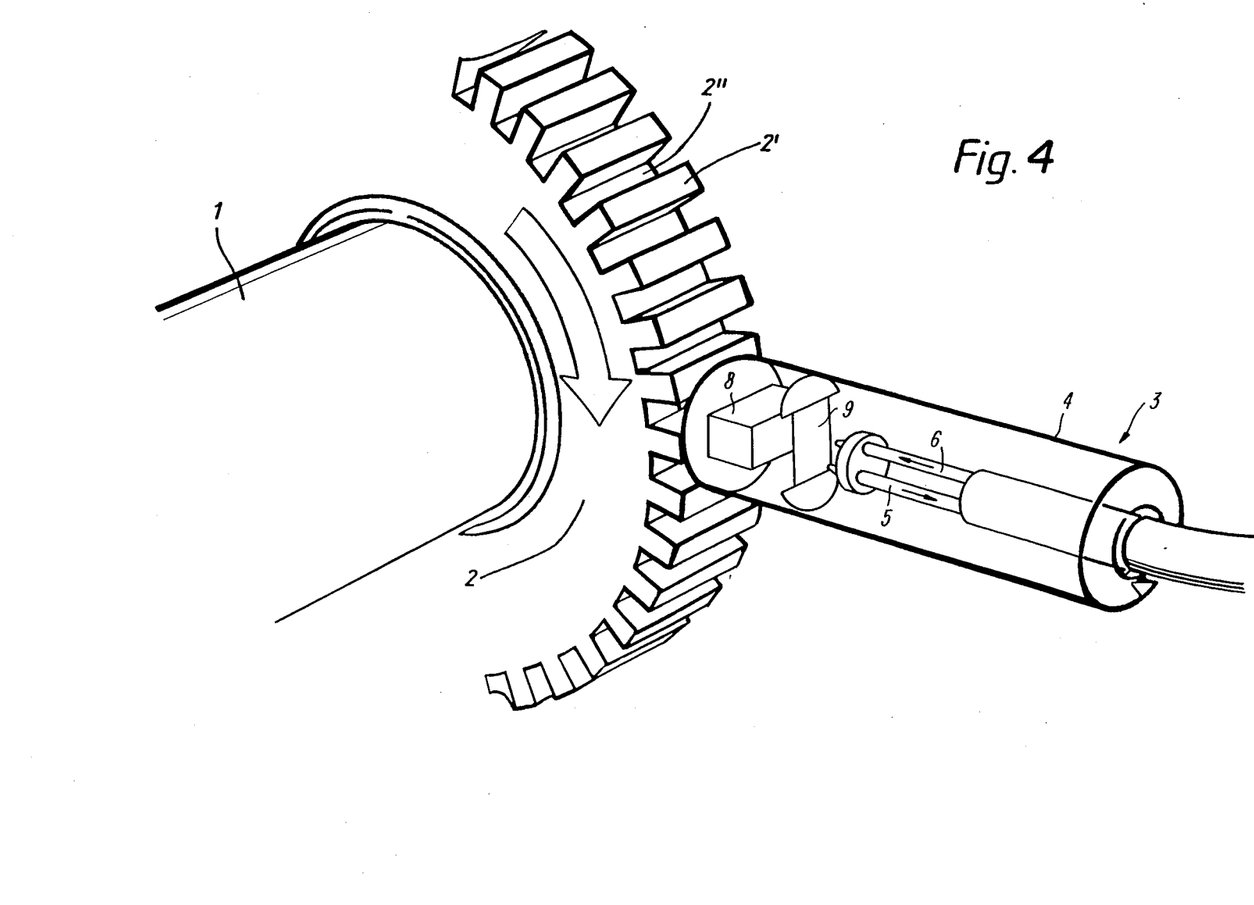
Figure 5:
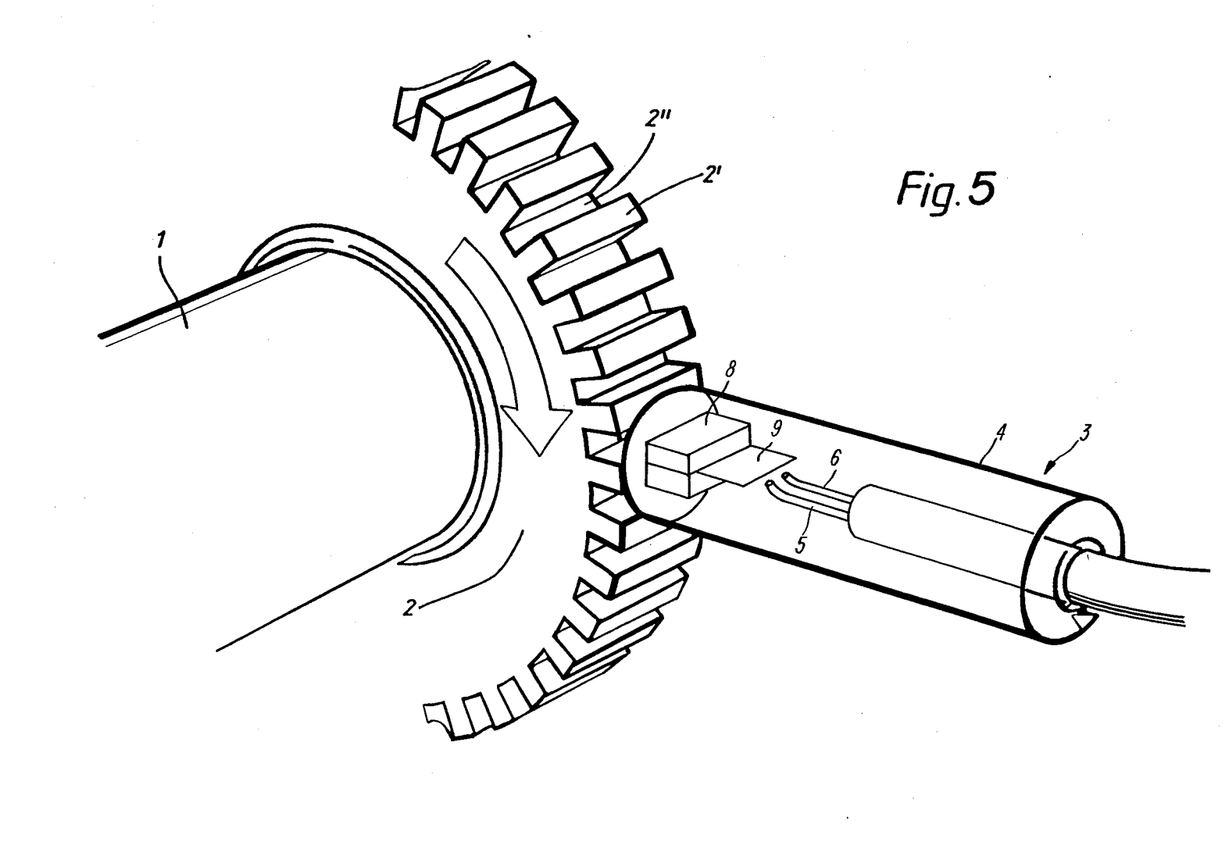

While in the exemplary embodiments according to FIGS. 1 to 3 the permanent magnet and, together with it, the modular part are movably disposed, in the exemplary embodiments according to FIGS. 4 and 5 the permanent magnet 8 is fixedly disposed in the housing 4, namely with the pole axis extending perpendicular to the longitudinal direction of the housing and tangentially to the movement generator 2. Effects of external acceleration forces on the sensor are reduced by the fixed arrangement of the permanent magnet in the housing. According to FIG. 4, between the permanent magnet 7 and the optical fibers 5 and 6, there is disposed the modulator part 9, which is constructed as a ferromagnetic foil, e.g. consisting of an amorphous alley, with a mirror-coated surface extending parallel to the pole axis, tangentially to the movement generator and perpendicular to the longitudinal direction of the housing. In such an arrangement of the permanent magnet 8, the field lines extend tangentially to the movement generator 2 and are closed on the one hand via the teeth and on the other hand via the ferromagnetic modulator part 9, so that the magnetic flux is modulated by means of the modulator part 9 and thus the deflection thereof in the cycle of the sequence frequency of the teeth, which creates a situation in which also a greater or lesser proportion of the light radiation emitted by the transmitting optical fiber 6 is reflected by the modulator part 9 and coupled into the receiving optical fiber 5.

According to FIG. 5, the fixedly disposed permanent magnet 8 carries a movable modulator part 9, which extends in the longitudinal direction of the housing 4 and which stands perpendicular to the pole axis of the magnet and which is constructed as a ferromagnetic amorphous metal strip. In the case of a symmetrical setting of the teeth of the movement generator 2 relative to the permanent magnet 8, this modulator part 9 is penetrated vertically by the field lines of the permanent magnet, and is in an equilibrium condition, which is stablized by the mechanical resilience of the same in accordance with the transverse beam principle. In the case of an asymmetric setting of the teeth, the course of the field lines becomes asymmetric, whereby the modulator part 9 bends upwards or downwards. When the shaft rotates, this leads to an oscillation of the modulator part 9 with the simple sequence frequency of the teeth—with the avoidance of higher-order regions of instability according to Strutt's map—so that, in this instance also, a greater or lesser proportion of the light radiation emitted by the transmitting optical fiber 6 is reflected by the mirror-coated surface of the modulator part 9 and coupled into the receiving optical fiber 5.

Figure 4A:
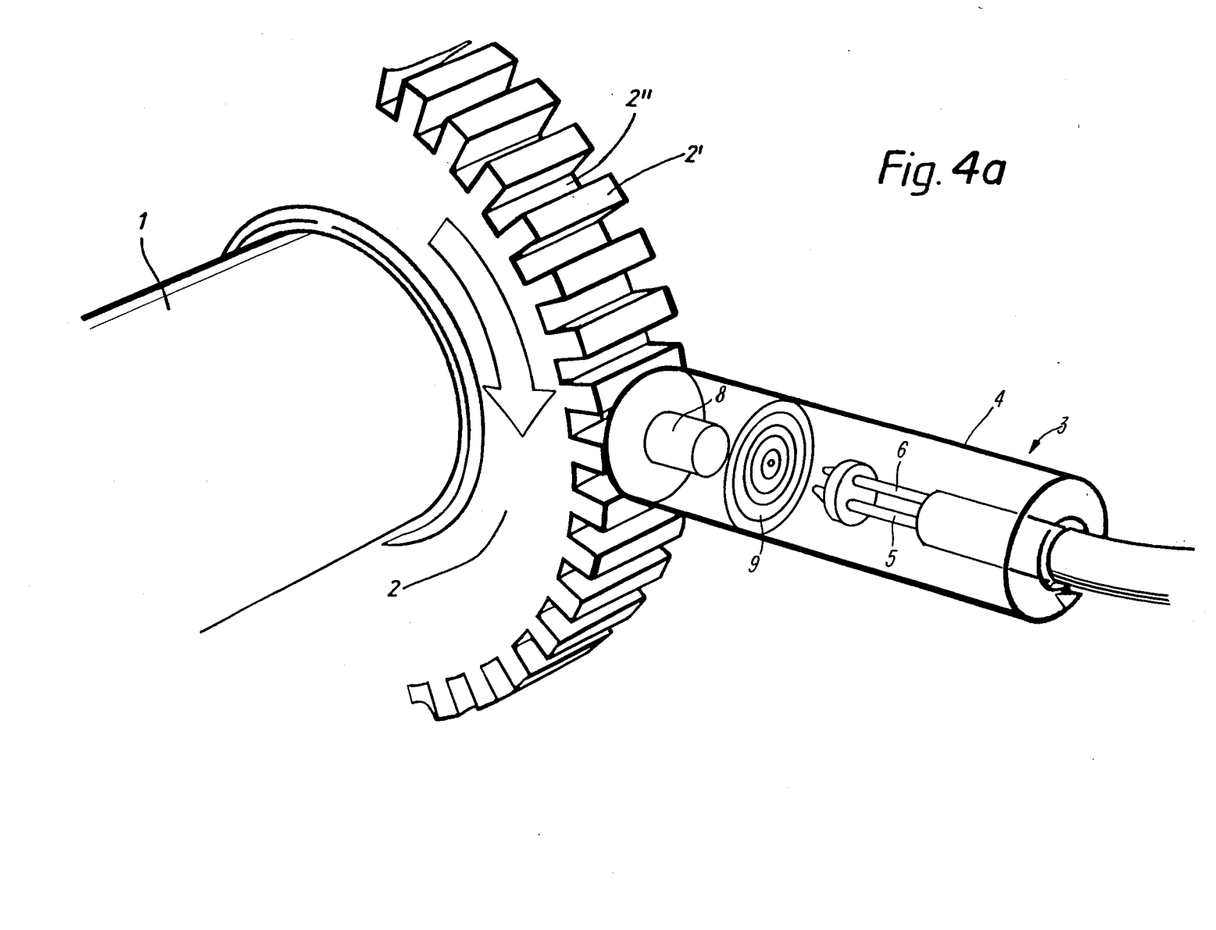

By way of a modification in relation to the exemplary embodiment according to FIG. 4, in the exemplary embodiment according to 4a the permanent magnet 8 is likewise disposed fixedly in the housing 4, but with the pole axis extending in the longitudinal direction of the housing and radially in relation to the movement generator 2. The same arrangement of the permanent magnet can also be made in the exemplary embodiment according to FIG. 5.

Figure 6:
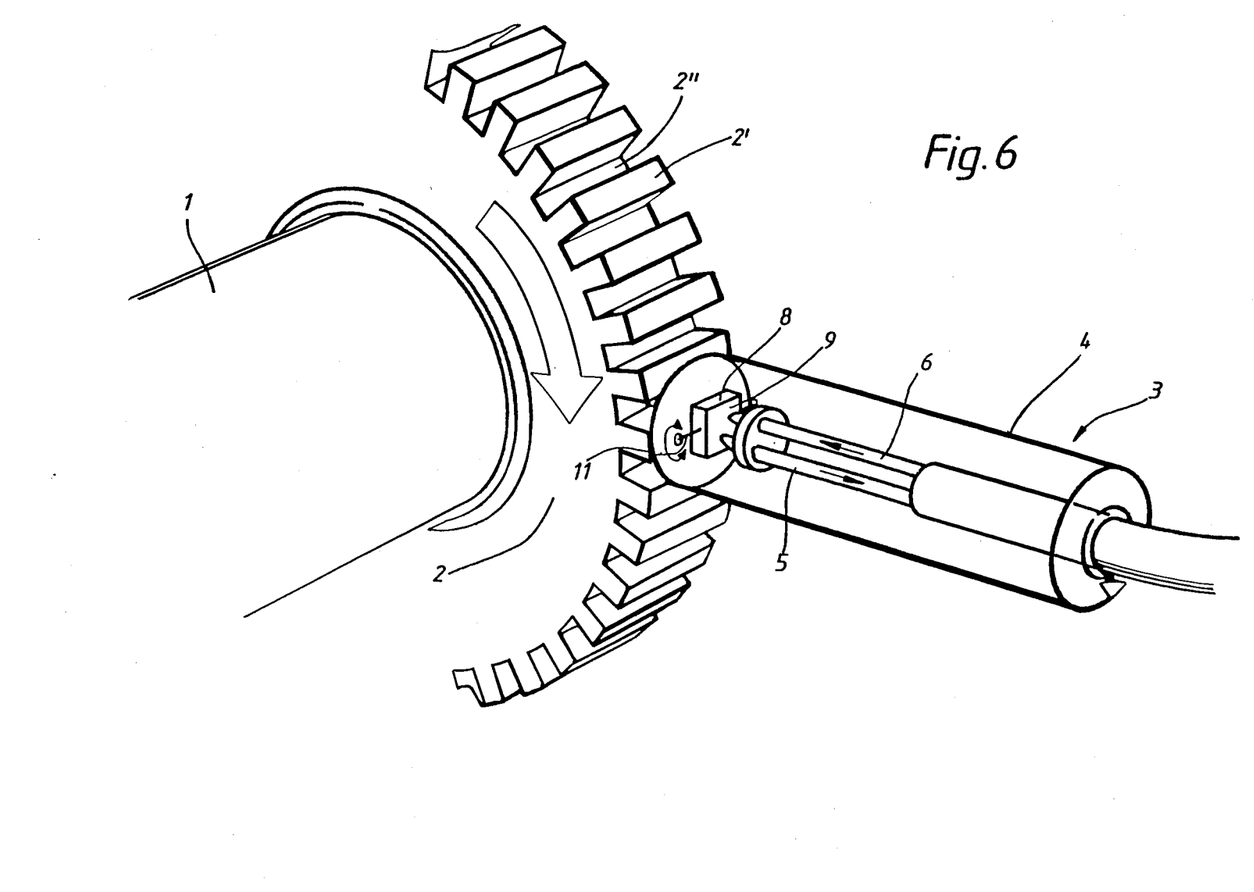
Figure 7:
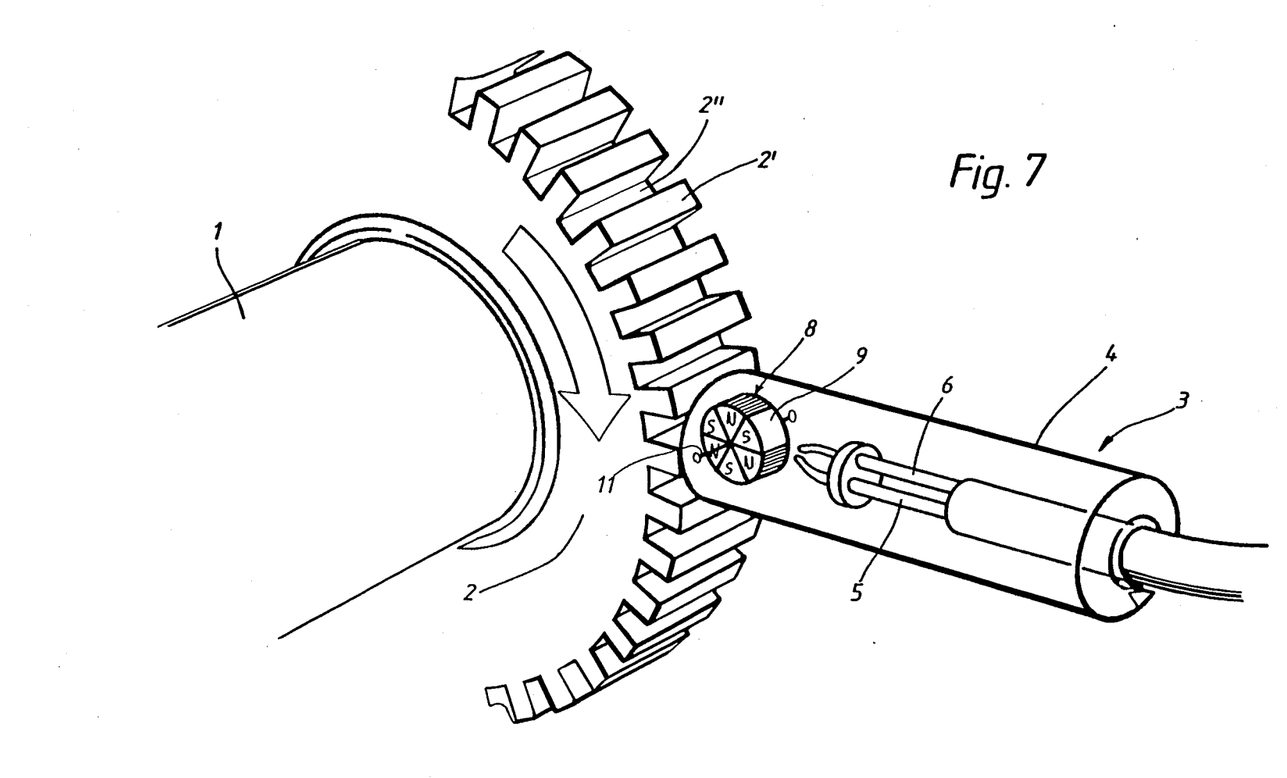
Figure 8:
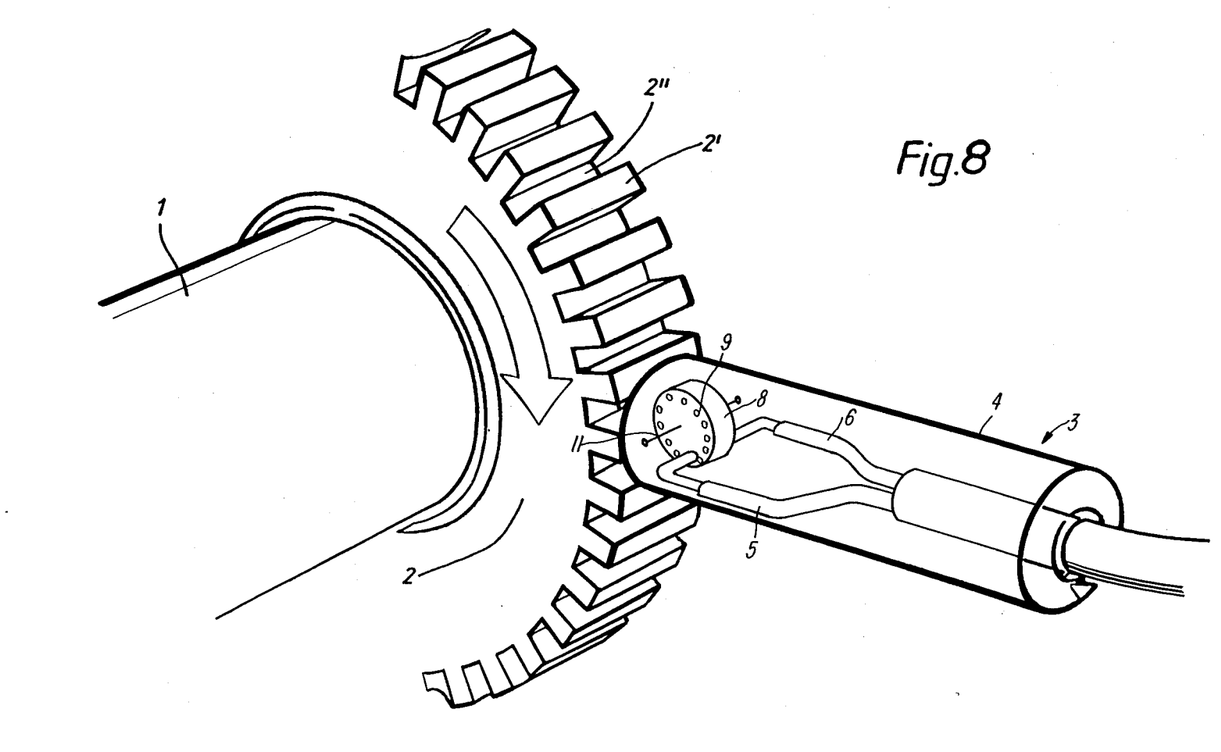

In the exemplary embodiments according to FIGS. 6 to 8, the permanent magnet 8 is mounted in the housing 4 so as to be rotatable about a transverse axle 11 extending perpendicular to the longitudinal direction of the housing 4 and parallel to the axle of the movement generator 2.

According to FIG. 6, the permanent magnet 8 likewise carries—as in FIGS. 1 and 2—a modulator part 9 constructed as a mirror-coated surface. The permanent magnet 8, the field of which extends radially in relation to the movement generator 2 and in the longitudinal direction of the housing 4, invariably adopts such a position, when the shaft is rotating, that the magnetic axis points in the direction of the next tooth of the movement generator 2. Consequently, it executes a rotary oscillation with the sequence frequency of the teeth, so that the light radiation emitted by the transmitting optical fiber 6 is reflected by the modulator part 9 and, in appropriately modulated form, is coupled into the receiving optical fiber 5.

According to FIG. 7, the permanent magnet 8 is constructed as a radially magnetized ring magnet, which is coordinated, in its geometry, with the tooth width of the movement generator 2. When the shaft is rotating, and thus the teeth pass by the permanent magnet 8, the magnet also rotates, the frequency of rotation thereof corresponding to the sequence frequency of the teeth divided by the number of magnet poles. Light radiation emitted by the transmitting optical fiber 6 is accordingly reflected by the modulator part 9, which is formed by coatings which are applied on the periphery of the ring magnet in accordance with the number of magnet poles and which are alternately highly and weakly reflecting, and this reflected light, in appropriately modulated form, is coupled into the receiving optical fiber 5. Thus, the modulation frequency corresponds to the sequence frequency of the teeth.

According to FIG. 8, the permanent magnet 8, which is likewise constructed as a ring magnet as in FIG. 7, exhibits near to its external periphery passage bores, which serve as the modulator part 8 and which extend parallel to the transverse axle 11 and which were produced, for example, by laser drilling. On the center line of a bore there is disposed on one side of the permanent magnet the transmitting optical fiber 6 and on the other side of the permanent magnet the receiving optical fiber 5, in such a manner that the light radiation emitted by the transmitting optical fiber, appropriately modulated by the modulator part 9 constructed in the manner of a perforated plate, is coupled into the receiving optical fiber 5. In this arrangement, the number of bores corresponds to the number of magnetic poles or to a multiple thereof.

Figure 9:
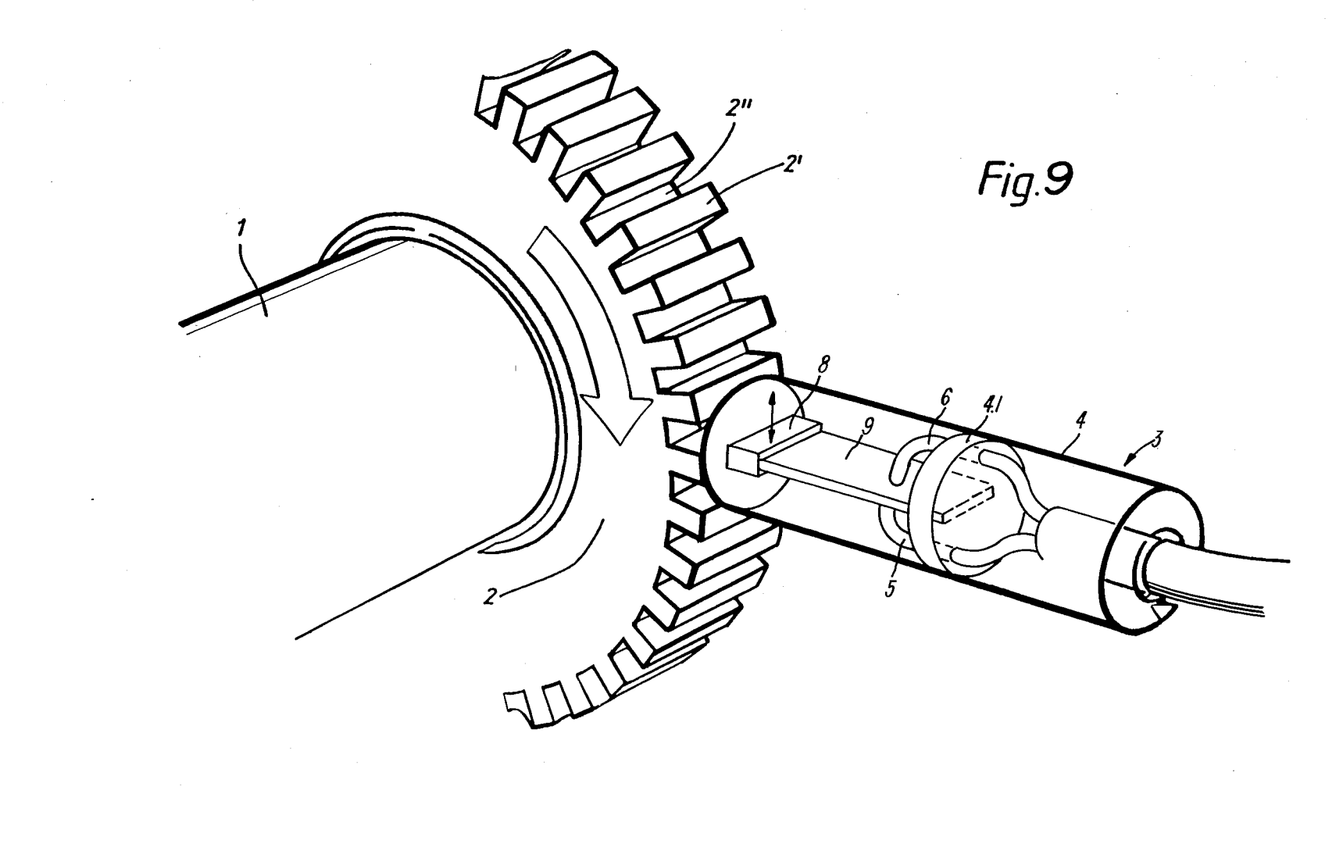

In the exemplary embodiment according to FIG. 9, the modulator part 9 is secured, extending in the longitudinal direction of the housing, by means of a suitable holder 4.1 in the housing 4 in the manner of a resilient tongue. At the end of the modulator part 9 facing the movement generator 2, the modulator part carries the permanent magnet 8, which, when the movement generator passes by, brings the modulator part 9 to oscillation. In this arrangement, the modulator part 9 consists of a light-transmitting material exhibiting stress birefringence, and is provided, on its flat sides, with crossed polarizing filters, so that in the course of oscillation, the light impinging on a flat side from the light transmitter 6 is coupled, in a form appropriately modulated in its intensity, into the receiving light guide 5 aligned on the other flat side.

Although in some exemplary embodiments an intensity modulation of the light by means of mirror-coated surfaces as the modulator part has been described, a modulation of the color (wavelength) or polarization of the light is also possible. Thus, the optical signal transmission can be made neutral in terms of path, if the modulator part, instead of being constructed as a mirror-coated surface, is constructed as a zone or line grating—as shown, for example, in FIG. 4a—so that, when white light is used on the transmission side, a color modulation is obtained on the receiving side, in place of a pure intensity modulation.

In all exemplary embodiments, the components of the sensor 3, i.e. the optical modulator 8, 9, the light transmitter 6 and the receiving optical fiber 5, are accommodated in the hermetically sealed housing, out of which only the extension to the electronic analysis system connected downstream passes. In principle, the housing can be provided on its end side—on the side facing the movement generator 2—with an abrasion-resistant closure, in order in this manner to avoid instances of damage in the event of any possible contacts of the same with the movement generator. Moreover, the housing can also be filled with a damping liquid of suitable viscosity, in order in this manner to be able to take account of resonance effects and/or acceleration forces caused by vibration. In order to be able to detect movements of high frequency, the resonance frequency of the system should be chosen to be higher than the greatest signal frequency.

With such a magneto-optical fiber sensor according to the invention, having the smallest dimensions, it is thus possible, even in a coarse environment and without falsifying the measure value, not only, as described, to scan the speed of rotation or the angle of rotation of a shaft on a non-contact basis, but also to detect any movement or position of a component.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Fiber optic sensor for the detection of the movement or position of a component, in particular of the speed of rotation or of the angle of rotation of a shaft, having a movement generator exhibiting magnetically highly effective and magnetically weekly effective regions, such as a ferromagnetic movement generator constructed as a toothed wheel or as a perforated or slotted diaphragm, which sensor exhibits a light transmitter and at least one light guide in a housing, and a light irradiated by the light transmitter is coupled into the light guide via an optical modulator in order to influence the light by the scanned movement generator, both the light transmitter and also thelight guide being connectable to an electronic analyzing system wherein the optical modulator has at least a permanent magnet and a modulator part disposed in a housing of the sensor in an end region of the housing facing the movement generator, wherein the modulator part is mounted to be movable relative to the light transmitter and the light guide, so that a change-caused by the movement generator-in the course of the field lines emanating the permanent magnet, causes a movement of the modulator part.

2. Fiber optic sensor according to claim 1, wherein the housing has an end region-facing the movement generator,-wherein the housing of the sensor there is disposed an elastic foil, and wherein the permanent magnet is disposed in center portion of the elastic foil with a pole axis extending in a longitudianal direction of the housing.

3. Fiber optic sensor according to claim 2, wherein the modulator part comprises an aperture which is situated between the light guide and the light transmitter and which is disposed on a color modulating filter.

4. Fiber optic sensor according to claim 2, wherein the modulator part comprises a surface of the permanent magnet, the surface faces the light guide and the light transmitter and is mirror-coated or provided with a zone or line grating.

5. Fiber optic sensor according to claim 2, wherein the modulator part comprises an aperture which is situated between the light guide and the light transmitter and which is disposed on the permanent magnet.

6. Fiber optic sensor according to claim 2, wherein the elastic foil is formed of plastic material.

7. Fiber optic sensor according to claim 1, wherein the permanent magnet is disposed in an end region-facing the movement generator-of the housing of the sensor so as to be rigid with the housing and with the pole axis extending perpendicular to a longitudinal direction of the housing and tangentially to the movement generator.

8. Fiber optic sensor according to claim 7, wherein the modulator part comprises a ferromagnetic foil, disposed in the housing between the permanent magnet and the light guides, with a surface which faces the light guides and which is mirror-coated or provided with a zone or line grating.

9. Fiber optic sensor according to claim 7, wherein the modulator part is a ferromagnetic metal strip, clamped in the permanent magnet and extending in the longitudinal direction of the housing, with a surface which faces the light guides, the surface being mirror-coated or provided with a zone or a line grating.

10. Fiber optic sensor according to claim 1, wherein the permanent magnet is disposed in the end region-facing the movement generator-of the housing of the sensor so as to be rigid with the housing and with the pole axis extending in a longitudinal direction of the housing and radially in relation to the movement generator.

11. Fiber optic sensor according to claim 1, wherein the permanent magnet is mounted in the end region—facing the movement generator—of the housing of the sensor so as to be rotatable in the housing about a transverse axis extending perpendicular to a longitudinal direction of the housing and parallel to the axis of the movement generator.

12. Fiber optic sensor according to claim 11, wherein the permanent magnet is constructed as a radially magnetized ring magnet with a plurality of poles and the modulator part is formed by a coating which is applied to the periphery of the ring magnet in accordance with the number of poles and which is alternately highly reflective and weakly reflective or by a line grating with an alternately large and small spacing.

13. Fiber optic sensor according to claim 11, wherein the permanent magnet is constructed as a radially magnetized ring magnet with a plurality of poles, and the modulator part is formed with transverse bores which are disposed near to the periphery of the ring magnet in accordance with the number of poles or a multiple thereof.

14. Fiber optic sensor according to claim 1, wherein the modulator part comprises a flat strip-which extends in a longitudinal direction of the housing and is clamped so as to be rigid with the housing-said flat strip being formed of light-transmitting material exhibiting stress birefringence, said strip being provided on both flat sides with crossed polarizing filters and said strip carries the permanent magnet at its end which faces the movement generator, the magnetic end is not free to move.

15. Fiber optic sensor according to claim 1, wherein the housing contains a damping liquid of suitable viscosity.

16. Fiber optic sensor according to claim 1, wherein the housing, at an end side of an end region facing the movement generator, has an abrasion-resistant, sealed closure.

17. Fiber optic sensor according to claim 1, wherein the light transmitter is constructed as one of an optical fiber, an incandescent lamp, and a light-emitting diode.

18. Fiber optic sensor according to claim 1, wherein a zone or line grating is photo-lithographed by holographic means directly onto the modulator part.

* * * * *